(12) United States Patent
Zakharov et al.

(10) Patent No.: US 11,283,956 B2
(45) Date of Patent: Mar. 22, 2022

(54) METHODS, SYSTEMS, AND STORAGE MEDIA FOR ISSUING AND VERIFYING A SECONDARY CRYPTOGRAPHIC PHOTO ID

(71) Applicant: KYOCERA DOCUMENT SOLUTIONS INC., Osaka (JP)

(72) Inventors: Oleg Y. Zakharov, Walnut Creek, CA (US); Jeffrey Li, Concord, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 108 days.

(21) Appl. No.: 16/891,913

(22) Filed: Jun. 3, 2020

(65) Prior Publication Data
US 2021/0385340 A1    Dec. 9, 2021

(51) Int. Cl.
    H04N 1/00         (2006.01)
    H04N 1/32         (2006.01)
    G06T 1/00         (2006.01)

(52) U.S. Cl.
    CPC ....... *H04N 1/0087* (2013.01); *H04N 1/32144* (2013.01); *H04N 1/32149* (2013.01); *H04N 1/32272* (2013.01); *G06T 1/0085* (2013.01); *H04N 1/32101* (2013.01)

(58) Field of Classification Search
None
See application file for complete search history.

(56) References Cited

U.S. PATENT DOCUMENTS

| | | | |
|---|---|---|---|
| 5,841,886 A | 11/1998 | Rhoads | |
| 6,389,151 B1 | 5/2002 | Carr et al. | |
| 6,751,336 B2 | 6/2004 | Zhao | |
| 2004/0158740 A1* | 8/2004 | Lien | G07C 9/22 40/625 |
| 2007/0176000 A1* | 8/2007 | Cattrone | G06K 1/121 235/462.01 |
| 2014/0233047 A1* | 8/2014 | Kishimoto | H04N 1/00838 358/1.9 |
| 2017/0272603 A1* | 9/2017 | Shindoh | H04N 1/44 |

* cited by examiner

*Primary Examiner* — Miya J Williams
(74) *Attorney, Agent, or Firm* — GrowIP Law Group LLC

(57) ABSTRACT

Methods, systems, and storage media for issuing and verifying a secondary cryptographic photo ID are disclosed. Exemplary implementations may: capture, using a scanning component of a printing device, a primary digital image of a primary photo ID; recognize, using a processing component of the printing device, alphanumeric information in the captured primary digital image; encrypt, using the processing component of the printing device, the recognized alphanumeric information; generate, using the processing component of the printing device, a digital watermark comprising the encrypted recognized alphanumeric information; recognize, using the processing component of the printing device, a photograph in the primary digital image; generate, using the processing component of the printing device, a secondary digital image comprising the recognized photograph and the generated digital watermark; and print, using a printing component of the printing device, a secondary photo ID comprising the secondary digital image.

20 Claims, 8 Drawing Sheets

METHODS, SYSTEMS, AND STORAGE MEDIA FOR ISSUING AND VERIFYING A SECONDARY CRYPTOGRAPHIC PHOTO ID

FIELD

The present disclosure relates to methods, systems, and storage media for issuing and verifying a secondary cryptographic photo ID.

BACKGROUND

A typical photo identification (ID), like the photo ID 800 illustrated in FIG. 8, contains some or all of the following information: a photo, full name, date of birth, address, sex, height, weight, hair color, and eye color. The combination of all this identifiable information on a single card, such as a driver's license, state ID card, or passport, creates a potential risk that a criminal could steal the card holder's identity, for example.

However, photo IDs are often required, such as for travel to a foreign country, driving a motor vehicle, picking up a medication prescription, and other situations. Therefore, not carrying or possessing a photo ID is not an option for most people.

Needed is a method and system for issuing a photo ID that lessens the potential risk of identity theft while still providing authorities, such as police, access control personnel or devices, and others, with a verifiable photo ID.

SUMMARY

One aspect of the present disclosure relates to a method for issuing and verifying a secondary cryptographic photo ID. The method may include capturing, using a scanning component of a printing device, a primary digital image of a primary photo ID. The printing device may be authorized on a trusted network. The method may include recognizing, using a processing component of the printing device, alphanumeric information in the captured primary digital image. The recognized alphanumeric information may include biographical information related to a person associated with the primary photo ID. The method may include encrypting, using the processing component of the printing device, the recognized alphanumeric information. The method may include generating, using the processing component of the printing device, a digital watermark including the encrypted recognized alphanumeric information. The method may include recognizing, using the processing component of the printing device, a photograph in the primary digital image. The photograph may be of the person associated with the primary photo ID. The method may include generating, using the processing component of the printing device, a secondary digital image including the recognized photograph and the generated digital watermark. The generated digital watermark at least partially spatially overlaps the recognized photograph in the secondary digital image. The method may include printing, using a printing component of the printing device, a secondary photo ID including the secondary digital image, in which the secondary photo ID does not include the biographical information related to the person associated with the primary photo ID.

Another aspect of the present disclosure relates to a system configured for issuing and verifying a secondary cryptographic photo ID. The system may include one or more hardware processors configured by machine-readable instructions. The processor(s) may be configured to capture, using a scanning component of a printing device, a primary digital image of a primary photo ID. The printing device may be authorized on a trusted network. The processor(s) may be configured to recognize, using a processing component of the printing device, alphanumeric information in the captured primary digital image. The recognized alphanumeric information may include biographical information related to a person associated with the primary photo ID. The processor(s) may be configured to encrypt, using the processing component of the printing device, the recognized alphanumeric information. The processor(s) may be configured to generate, using the processing component of the printing device, a digital watermark including the encrypted recognized alphanumeric information. The processor(s) may be configured to recognize, using the processing component of the printing device, a photograph in the primary digital image. The photograph may be of the person associated with the primary photo ID. The processor(s) may be configured to generate, using the processing component of the printing device, a secondary digital image including the recognized photograph and the generated digital watermark. The generated digital watermark at least partially spatially overlaps the recognized photograph in the secondary digital image. The processor(s) may be configured to print, using a printing component of the printing device, a secondary photo ID including the secondary digital image, in which the photo ID does not include the biographical information related to the person associated with the primary photo ID.

Yet another aspect of the present disclosure relates to a non-transient computer-readable storage medium having instructions embodied thereon, the instructions being executable by one or more processors to perform a method for issuing and verifying a secondary cryptographic photo ID. The method may include capturing, using a scanning component of a printing device, a primary digital image of a primary photo ID. The printing device may be authorized on a trusted network. The method may include recognizing, using a processing component of the printing device, alphanumeric information in the captured primary digital image. The recognized alphanumeric information may include biographical information related to a person associated with the primary photo ID. The method may include encrypting, using the processing component of the printing device, the recognized alphanumeric information. The method may include generating, using the processing component of the printing device, a digital watermark including the encrypted recognized alphanumeric information. The method may include recognizing, using the processing component of the printing device, a photograph in the primary digital image. The photograph may be of the person associated with the primary photo ID. The method may include generating, using the processing component of the printing device, a secondary digital image including the recognized photograph and the generated digital watermark. The generated digital watermark at least partially spatially overlaps the recognized photograph in the secondary digital image. The method may include printing, using a printing component of the printing device, a secondary photo ID including the secondary digital image, in which the secondary photo ID does not include the biographical information related to the person associated with the primary photo ID.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodi-

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

Photo IDs provide a way for a person to prove, with some level of certainty, that the person is who they say they are. The person can present the photo ID to an examining authority, such as by handing the photo ID to a human examining authority (e.g. a police officer, customs official, border control agent, librarian, etc.), by inserting the photo ID into a card-reader slot, or by placing the photo ID in proximity with wireless card reader, for example. The examining authority can compare the person's appearance in the photo on the photo ID to the person's actual appearance (what they look like as they stand before the examining authority). In the case of a human examining authority, this comparison can be made manually by simply looking at the photo ID and the presenting person. In the case of a non-human examining authority, the photo in the photo ID can be compared to a current photo taken of the presenting human. Upon determining that the photo in the photo ID looks sufficiently similar to the presenting person, the examining authority may determine that biographical information printed on the photo ID corresponds to the person.

Figure 8:
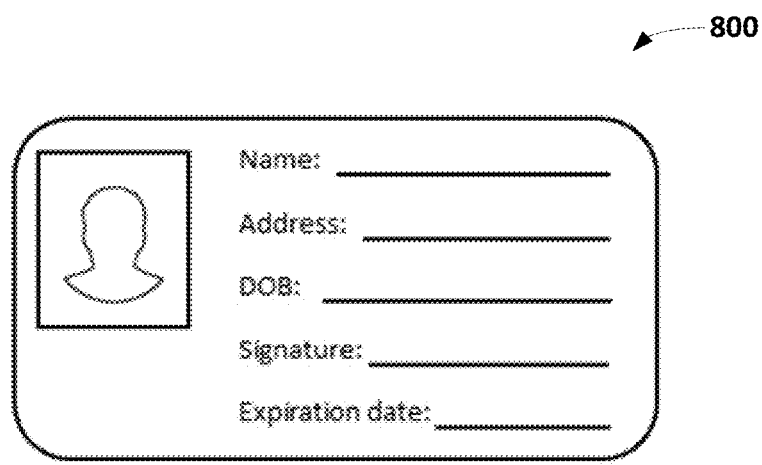
FIG. 8 illustrates a simplified pictorial diagram exemplifying a typical photo ID with human readable personal information.

Photo IDs present several risks, however. Since a typical photo ID, such as the photo ID 800 illustrated in FIG. 8, contains a photo, full name, date of birth, address, sex, height, weight, hair color, eye color, and/or other information that might not be easily ascertainable, photo IDs present an identity theft risk. Such a risk might be realized if the photo ID were to be lost, for example. Another risk might arise if the photo ID is presented to an unreliable or unauthorized examining "authority". Besides risking possible identity theft, conventional photo IDs make it difficult to maintain privacy of a person's biographical information. However, since photo IDs are often required, such as for travel to a foreign country, driving a motor vehicle, picking up a medication prescription, and other situations, not carrying or possessing a photo ID is not viable for most people.

Therefore, the present disclosure describes methods and systems for issuing a photo ID that lessens the potential risk of identity theft while still providing authorities, such as police, access control personnel/devices, and others, with a verifiable photo ID. By asymmetrically encrypting the person's identifiable biographical information into a watermark imprinted atop the person's photo, the photo ID helps to prevent unauthorized viewing of such biographical information, while still presenting a photo for appearance comparison by the examining authority. The examining authority, if properly authorized, can decrypt the watermark to verify the photo ID and its biographical information.

One aspect of the present disclosure relates to a system configured for issuing and verifying a secondary cryptographic photo ID. The system may include one or more hardware processors configured by machine-readable instructions. The processor(s) may be configured to capture, using a scanning component of a printing device, a primary digital image of a primary photo ID. The printing device may be authorized on a trusted network. The processor(s) may be configured to recognize, using a processing component of the printing device, alphanumeric information in the captured primary digital image. The recognized alphanumeric information may include biographical information related to a person associated with the primary photo ID. The processor(s) may be configured to encrypt, using the processing component of the printing device, the recognized alphanumeric information. The processor(s) may be configured to generate, using the processing component of the printing device, a digital watermark including the encrypted recognized alphanumeric information. The processor(s) may be configured to recognize, using the processing component of the printing device, a photograph in the primary digital image. The photograph may be of the person associated with the primary photo ID. The processor(s) may be configured to generate, using the processing component of the printing device, a secondary digital image including the recognized photograph and the generated digital watermark. The generated digital watermark at least partially spatially overlaps the recognized photograph in the secondary digital image. The processor(s) may be configured to print, using a printing component of the printing device, a secondary photo ID including the secondary digital image, in which the secondary photo ID does not include the biographical information related to the person associated with the primary photo ID.

In some implementations of the system, the processor(s) may be configured to recognize in the primary photo ID photograph at least a portion of an image of the person associated with the primary photo ID. In some implementations of the system, the generated digital watermark at least partially spatially overlaps the recognized at least the portion of the image of the person associated with the primary photo ID.

In some implementations of the system, the processor(s) may be configured to recognize in the primary photo ID photograph an image of a face of the person associated with the primary photo ID. In some implementations of the system, the generated digital watermark at least partially spatially overlaps the recognized image of the face of the person associated with the primary photo ID.

In some implementations of the system, the generated digital watermark may be unique to the printing device. For example, the generated digital watermark may include an identifier associated with the printing device, such as one selected from the group consisting of a serial number, a unique code, a date and time of manufacturing of the printing device, or a unique image.

In some implementations of the system, generating, using the processing component of the printing device, a secondary digital image including the recognized photograph and the generated digital watermark may include integrating the generated digital watermark into the recognized photograph in the secondary digital image.

In some implementations of the system, generating, using the processing component of the printing device, a secondary digital image including the recognized photograph and the generated digital watermark may include integrating the generated digital watermark into the recognized photograph in the secondary digital image, so that the generated digital watermark at least partially overlaps the recognized face.

In some implementations of the system, the processor(s) may be configured to authenticate, by the printing device, a person associated with the primary photo ID, before printing the secondary photo ID.

In some implementations of the system, the secondary photo ID may be a temporary, cryptographic photo ID having an associated expiration date and/or time.

In some implementations of the system, the processor(s) may be configured to encrypt an expiration date that is associated with the encrypted recognized alphanumeric information. In some implementations of the system, the processor(s) may be configured to decrypt, using the processor of the reading device, the recognized alphanumeric information.

In some implementations of the system, the primary photo ID may be a passport, driver license, or identification card, for example, and the biographical information may include a full name of the person associated with the primary photo ID, a physical address of the person associated with the primary photo ID, a date of birth of the person associated with the primary photo ID, and/or an expiration date of the primary photo ID.

In some implementations of the system, the digital watermark may be in the form of a bar code or QR code, or the digital watermark may be imperceptible to an unassisted human eye.

In some implementations of the system, the digital watermark may be an embedded cryptographic watermark signed by at least a portion of the primary digital image or the recognized photograph.

In some implementations of the system, the encrypting may include using an asymmetric encryption algorithm. For example, the encrypting may be using a public key and a first private key. In some implementations of the system, the first private key may be associated with the printing device. In some implementations of the system, encrypting, using the processing component of the printing device, the recognized alphanumeric information may include encrypting the recognized alphanumeric information using an encryption key. In some implementations of the system, the processing component of the printing device may further communicate the key to a key database on the trusted network. In some implementations of the system, communicating the key to the key database may include communicating the key to an authorization service on the trusted network, to allow the authorization service to store the key in a key database maintained by the authorization service.

In some implementations of the system, encrypting, using the processing component of the printing device, the recognized alphanumeric information may include obtaining a key from an authorization service on the trusted network. In some implementations of the system, the authorization service may maintain a key database.

In some implementations of the system, a reading device may include processor(s) that may be configured to capture, using a digital camera of a reading device, the digital watermark from the secondary digital image of the secondary photo ID. In some implementations of the system, the processor(s) of the reading device may be configured to decrypt the recognized alphanumeric information. In some implementations of the system, the processor(s) of the reading device may be configured to render, on a display of the reading device, the decrypted recognized alphanumeric information.

In some implementations of the system, the reading device may be a portable handheld device that may be authorized on the trusted network.

In some implementations of the system, the digital camera of the reading device may include a scanner authorized on the trusted network.

In some implementations of the system, the decrypting, using a processor of the reading device, the recognized alphanumeric information may include the reading device communicating with an authorization service on the trusted network.

In some implementations of the system, the rendering, on the display of the reading device, the decrypted recognized alphanumeric information may allow for a user of the reading device to verify an identity of a person presenting the secondary photo ID by the user comparing the recognized photo in the secondary photo ID to an appearance of the person presenting the secondary photo ID. The user of the reading device may be, for example, at least one of a law enforcement officer, a government official, or an access-control person.

In some implementations of the system, decrypting, using the processor of the reading device, the recognized alphanumeric information may include accessing, by the reading device, a key database on the trusted network. In some implementations of the system, decrypting, using the processor of the reading device, the recognized alphanumeric information may include downloading a key associated with the digital watermark. In some implementations of the system, decrypting, using the processor of the reading device, the recognized alphanumeric information may include decrypting the encrypted recognized alphanumeric information using the downloaded key.

In some implementations of the system, the key database may be maintained by an authorization service on the trusted network. In some implementations of the system, a key used for encrypting and/or decrypting the recognized alphanumeric information may have an associated key expiration date.

In some implementations of the system, capturing, using the digital camera of the reading device, the digital watermark may include capturing, using the digital camera of the reading device, the secondary digital image from the secondary photo ID. In some implementations of the system, capturing, using the digital camera of the reading device, the digital watermark may include recognizing, using a processor of the reading device, the digital watermark from the secondary digital image.

In some implementations of the system, the encrypted recognized alphanumeric information may include an associated expiration date, after which decryption is not authorized. For example, in some implementations of the system, the encrypted recognized alphanumeric information may include an associated expiration date, after which the processor of the reading device is unable to decrypt the encrypted recognized alphanumeric information.

In some implementations of the system, the processor(s) may be configured to capture, using the digital camera of the reading device, an image of a person presenting the secondary photo ID. In some implementations of the system, the processor(s) may be configured to compare, using the processor of the reading device, the image of the person presenting the secondary photo ID with the recognized photograph in secondary digital image. In some implementations of the system, the processor(s) may be configured to determine whether the image of the person presenting the secondary photo ID matches, within a tolerance, with the recognized photograph in secondary digital image.

In some implementations of the system, the comparing and the determining may include the processor of the reading device executing instructions for facial recognition.

Another aspect of the present disclosure relates to a method for issuing and verifying a secondary cryptographic photo ID. The method may include capturing, using a scanning component of a printing device, a primary digital image of a primary photo ID. The printing device may be authorized on a trusted network. The method may include recognizing, using a processing component of the printing device, alphanumeric information in the captured primary digital image. The recognized alphanumeric information may include biographical information related to a person associated with the primary photo ID. The method may include encrypting, using the processing component of the printing device, the recognized alphanumeric information. The method may include generating, using the processing component of the printing device, a digital watermark including the encrypted recognized alphanumeric information. The method may include recognizing, using the processing component of the printing device, a photograph in the primary digital image. The photograph may be of the person associated with the primary photo ID. The method may include generating, using the processing component of the printing device, a secondary digital image including the recognized photograph and the generated digital watermark. The generated digital watermark at least partially spatially overlaps the recognized photograph in the secondary digital image. The method may include printing, using a printing component of the printing device, a secondary photo ID including the secondary digital image, in which the secondary photo does not include the biographical information related to the person associated with the primary photo ID.

In some implementations of the method, it may further include recognizing in the photograph at least a portion of an image of the person associated with the primary photo ID. In some implementations of the method, the generated digital watermark at least partially spatially overlaps the recognized at least the portion of the image of the person associated with the primary photo ID.

In some implementations of the method, it may further include recognizing in the photograph an image of a face of the person associated with the primary photo ID. In some implementations of the method, the generated digital watermark at least partially spatially overlaps the recognized image of the face of the person associated with the primary photo ID.

In some implementations of the method, the generated digital watermark may be unique to the printing device and may include an identifier associated with the printing device. For example, the identifier may be selected from the group consisting of a serial number, a unique code, a date and time of manufacturing of the printing device, or a unique image.

In some implementations of the method, it may include further including encrypting an expiration date that is associated with the encrypted recognized alphanumeric information.

In some implementations of the method, it may further include authenticating, by the printing device, a person associated with the primary photo ID, before printing the secondary photo ID.

In some implementations of the method, generating, using the processing component of the printing device, a secondary digital image including the recognized photograph and the generated digital watermark may include integrating the generated digital watermark into the recognized photograph in the secondary digital image.

In some implementations of the method, generating, using the processing component of the printing device, a secondary digital image including the recognized photograph and the generated digital watermark may include integrating the generated digital watermark into the recognized photograph in the secondary digital image, so that the generated digital watermark at least partially overlaps the recognized face.

In some implementations of the method, the primary photo ID may be a passport, driver license, or identification card for example. The biographical information may include a full name of the person associated with the primary photo ID, a physical address of the person associated with the primary photo ID, a date of birth of the person associated with the primary photo ID, and/or an expiration date of the primary photo ID.

In some implementations of the method, the secondary photo ID may be a temporary, cryptographic photo ID having an associated expiration date and/or time.

In some implementations of the method, the digital watermark may be in the form of a bar code or QR code. In some implementations of the method, the digital watermark may be imperceptible to an unassisted human eye. In some implementations of the method, the digital watermark may be an embedded cryptographic watermark signed by at least a portion of the primary digital image. In some implementations of the method, the digital watermark may be an embedded cryptographic watermark signed by at least a portion of the recognized photograph.

In some implementations of the method, the encrypting may include using an asymmetric encryption algorithm.

In some implementations of the method, the encrypting may be using a public key and a first private key. In some implementations of the method, the first private key may be associated with the printing device. In some implementations of the method, encrypting, using the processing component of the printing device, the recognized alphanumeric information may include encrypting the recognized alphanumeric information using public/private key encryption, and may further include communicating the key to a key database, such as one located on the trusted network.

In some implementations of the method, encrypting, using the processing component of the printing device, the recognized alphanumeric information may include encrypting the recognized alphanumeric information using a key. In some implementations of the method, encrypting, using the processing component of the printing device, the recognized alphanumeric information may include communicating the key to an authorization service on the trusted network, to allow the authorization service to store the key in a key database maintained by the authorization service.

In some implementations of the method, encrypting, using the processing component of the printing device, the recognized alphanumeric information may include obtaining a key from an authorization service on the trusted network. In some implementations of the method, the authorization service may maintain a key database.

In some implementations of the method, it may include capturing, using a digital camera of a reading device, the digital watermark from the secondary digital image of the secondary photo ID. In some implementations of the method, it may include decrypting, using a processor of the reading device, the recognized alphanumeric information. In some implementations of the method, it may include rendering, on a display of the reading device, the decrypted recognized alphanumeric information.

In some implementations of the method, the reading device may be a portable handheld device, such as one authorized on the trusted network.

In some implementations of the method, the digital camera of the reading device may include a scanner authorized on the trusted network.

In some implementations of the method, the decrypting, using a processor of the reading device, the recognized alphanumeric information may include the reading device communicating with an authorization service on the trusted network.

In some implementations of the method, the rendering, on the display of the reading device, the decrypted recognized alphanumeric information may allow for a user of the reading device to verify an identity of a person presenting the secondary photo ID by the user comparing the recognized photo in the secondary photo ID to an appearance of the person presenting the secondary photo ID.

In some implementations of the method, the user of the reading device may be at least one of a law enforcement officer, a government official, or an access-control person.

In some implementations of the method, decrypting, using the processor of the reading device, the recognized alphanumeric information may include accessing, by the reading device, a key database on the trusted network. In some implementations of the method, decrypting, using the processor of the reading device, the recognized alphanumeric information may include downloading a key associated with the digital watermark. In some implementations of the method, decrypting, using the processor of the reading device, the recognized alphanumeric information may include decrypting the encrypted recognized alphanumeric information using the downloaded key.

In some implementations of the method, the key database may be maintained by an authorization service on the trusted network. In some implementations of the method, a key used for encrypting and/or decrypting the recognized alphanumeric information may have an associated key expiration date.

In some implementations of the method, capturing, using the digital camera of the reading device, the digital watermark may include capturing, using the digital camera of the reading device, the secondary digital image from the secondary photo ID. In some implementations of the method, capturing, using the digital camera of the reading device, the digital watermark may include recognizing, using a processor of the reading device, the digital watermark from the secondary digital image.

In some implementations of the method, the encrypted recognized alphanumeric information may include an associated expiration date, after which decryption, such as by using the trusted network, is not authorized. In some implementations of the method, decrypting, using the processor of the reading device, the recognized alphanumeric information, may include only decrypting if the expiration date has not yet been reached.

In some implementations of the method, it may include capturing, using the digital camera of the reading device, an image of a person presenting the secondary photo ID. In some implementations of the method, it may include comparing, using the processor of the reading device, the image of the person presenting the secondary photo ID with the recognized photograph in secondary digital image. In some implementations of the method, it may include determining whether the image of the person presenting the secondary photo ID matches, within a tolerance, with the recognized photograph in secondary digital image.

In some implementations of the method, the comparing and the determining may include the processor of the reading device executing instructions for facial recognition.

Yet another aspect of the present disclosure relates to a non-transient computer-readable storage medium having instructions embodied thereon, the instructions being executable by one or more processors to perform a method for issuing and verifying a secondary cryptographic photo ID. For example, the method could be the method described immediately above, including one or more of the various implementations described above.

Even another aspect of the present disclosure relates to a computing platform configured for issuing and verifying a secondary cryptographic photo ID. The computing platform may include a non-transient computer-readable storage medium having executable instructions embodied thereon. The computing platform may include one or more hardware processors configured to execute the instructions. The processor(s) may execute the instructions to perform a method for issuing and verifying a secondary cryptographic photo ID. For example, the method could be the method described above, including one or more of the various implementations described above.

II. EXAMPLE COMPUTING DEVICES AND COMPUTING ENVIRONMENTS

Figure 1:
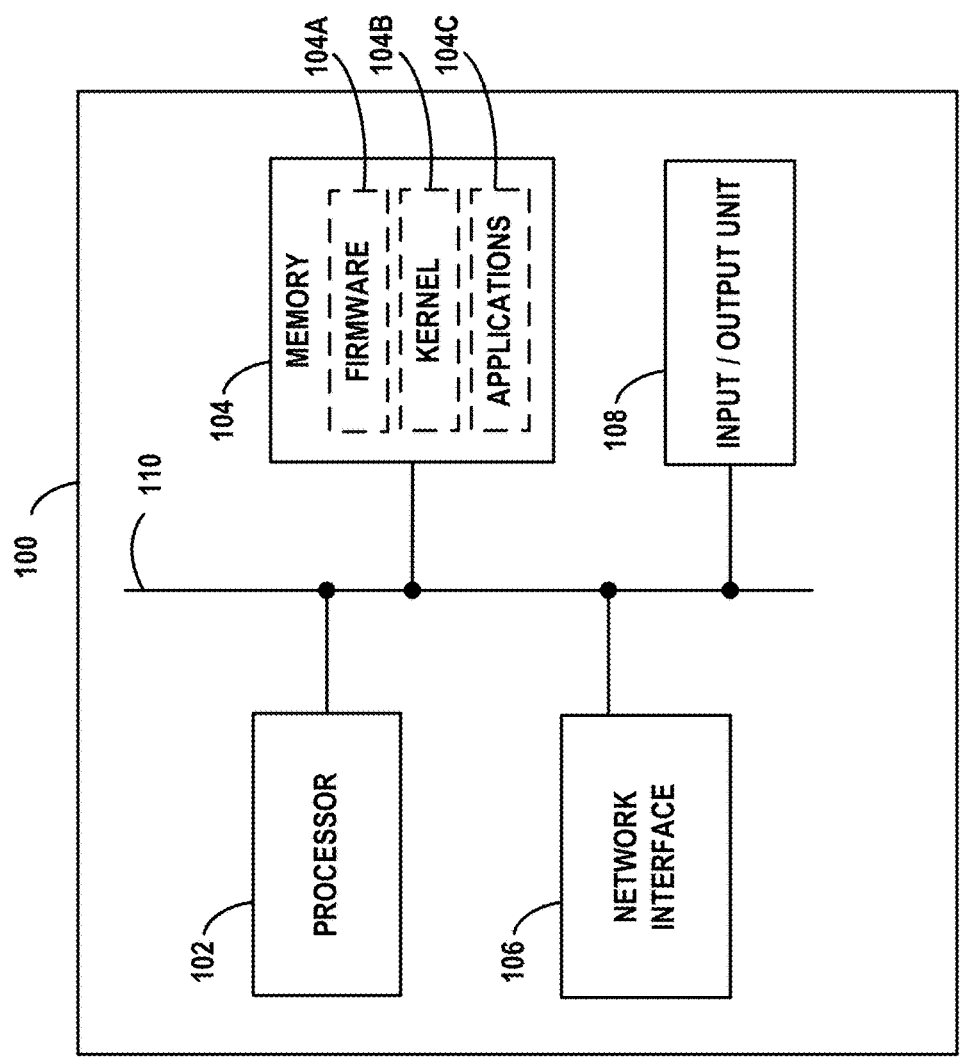
FIG. 1 illustrates a simplified block diagram exemplifying a computing device, with some of the components that could be included to operate in accordance with one or more implementations.

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user, such as a card reading device or printing device), a server device (e.g., a device that provides computational services to client devices, such as an authorization service), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, mouse, microphone, touch screen, card reader, card scanner, camera, scanner, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support various network architectures. The exact physical location, connectivity, and configuration of these computing devices may be unknown and/or unimportant. Accordingly, in some cases, the computing devices may be referred to as "cloud-based" devices that may be housed at various remote data center locations.

Figure 2:
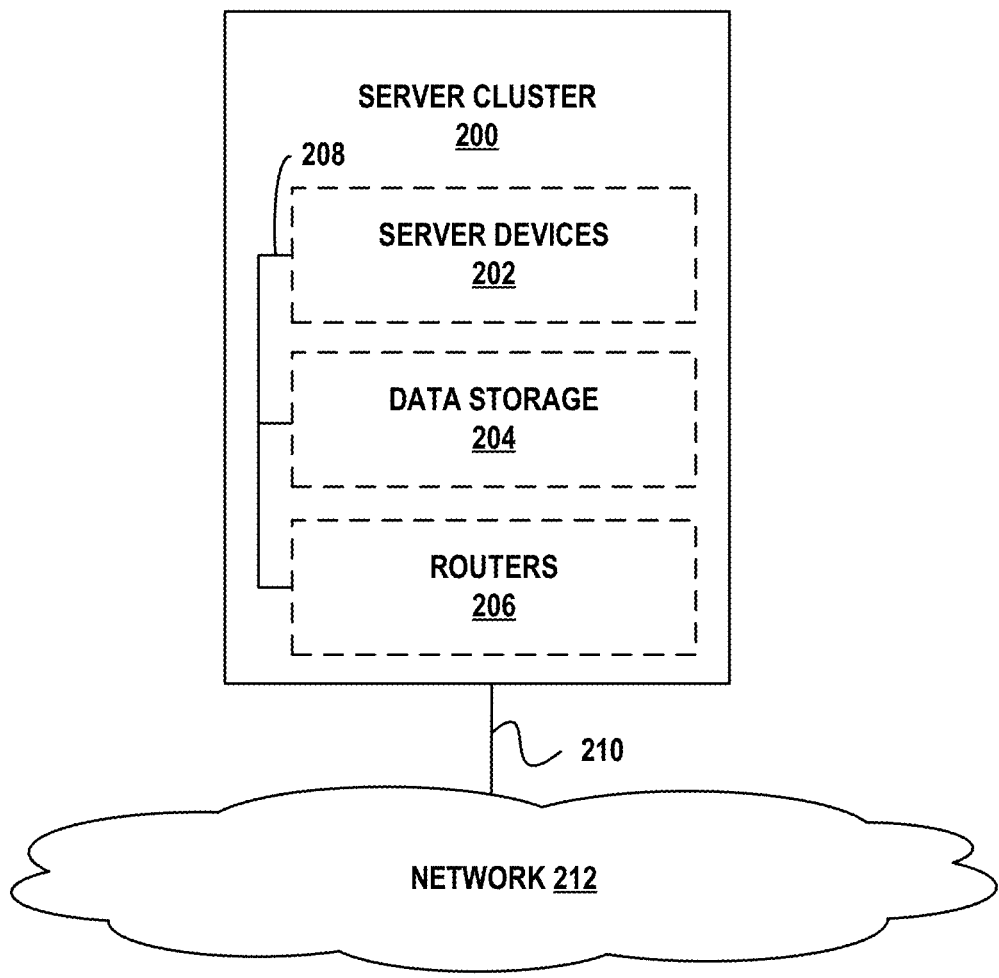
FIG. 2 illustrates a simplified block diagram exemplifying a cloud-based server cluster 200 in accordance with one or more implementations.

FIG. 2 depicts a cloud-based server cluster 200 in accordance with example embodiments. Such a cloud-based server cluster 200 could perform functions of an authorization service (e.g. maintaining a key database) on a trusted network, according to some implementations. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations. In some implementations, the server devices 202 communicate with printing devices and/or reading devices on a trusted network to assist with issuing and/or verifying a secondary photo ID.

Data storage 204 may be data storage arrays that include drive array controllers configured to manage read and write access to groups of hard disk drives and/or solid state drives.

The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used. The data storage 204 may, for example, store one or more encryption/decryption key databases to assist with issuing and/or verifying a secondary photo ID, such as by providing or verifying one or more keys associated with an encrypted watermark.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212, which may be a trusted network in some implementations.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

The following embodiments describe architectural and functional aspects of example networks, as well as the features and advantages thereof. Moreover, the advantages provided by the embodiments herein are not limited to large enterprises and may be applicable to an enterprise, or any other type of organization, of any size.

III. EXAMPLE NETWORK ARCHITECTURES

Figure 3:
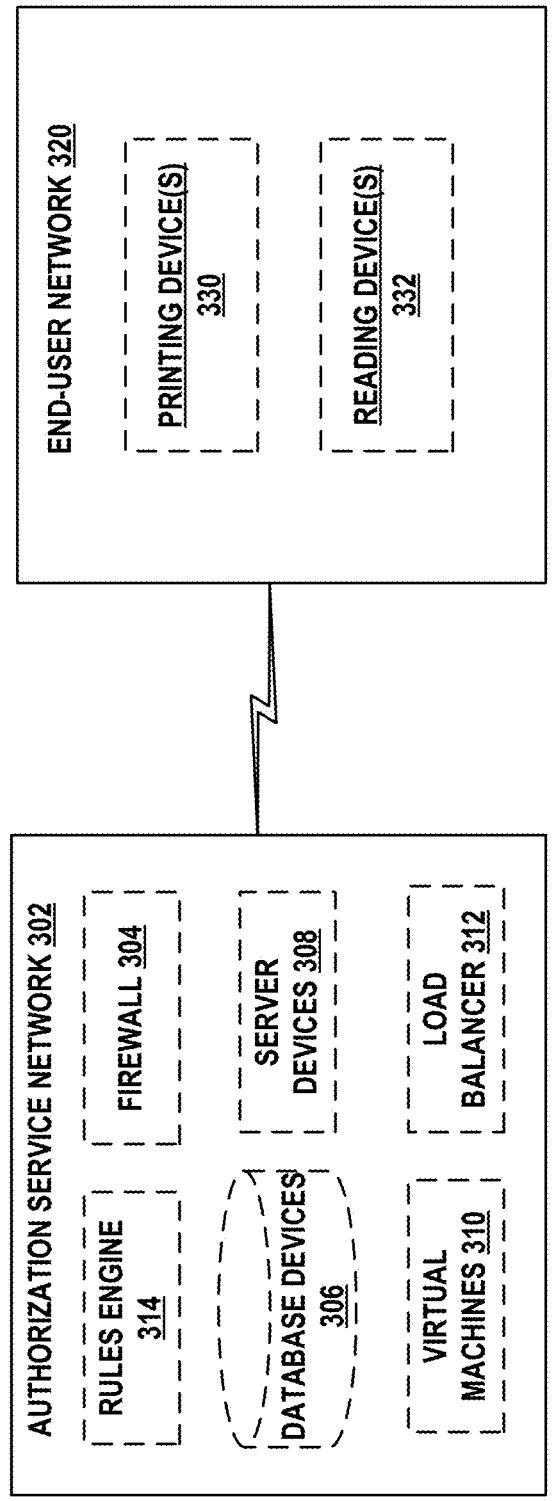
FIG. 3 illustrates a simplified block diagram exemplifying a network architecture, in accordance with one or more implementations.

FIG. 3 depicts a network architecture for a trusted network 300, in accordance with example embodiments. This architecture includes an authorization service network 302 and an end-user network 320.

Authorization service network 302 may be a computing network that provides management services (e.g., management services for issuing and verifying a secondary cryptographic photo ID) to users, particularly to end-user network 320. Such services may be configured by users from end-user network 320. For example, by way of web-based portals, users may specify logical directives, as well as generate reports, view analytics, and perhaps perform other tasks. In order to support various capabilities as described herein, authorization service network 302 may include firewall 304, database devices 306, server devices 308, virtual machines 310, load balancer 312, and rules engine 314, each of which may be embodied by computing device 100 and/or server cluster 200.

Firewall 304 may be one or more specialized routers or server devices that protect authorization service network 302 from unauthorized attempts to access the devices, applications, and services therein, while allowing authorized communication that is initiated from end-user network 300. Firewall 304 may also provide intrusion detection, web filtering, virus scanning, application-layer gateways, and other applications or services. Firewalls, such as firewall 310, typically deny all incoming communication sessions, unless such a session was ultimately initiated from behind the firewall (i.e., from a device on authorization service network 302) or the firewall has been explicitly configured to support the session. In some embodiments (not shown in FIG. 3), authorization service network 302 may include one or more virtual private network (VPN) gateways with which it communicates with end-user network 320.

Database devices 306 may be specialized hardware and/or software used to store data. For example, database devices 306 may include one or more relational databases (e.g., SQL), graph databases (e.g., neo4j), document databases (e.g., MongoDB), column databases (e.g., Cassandra) and/or other database models. In examples, database devices 306 may contain data related to the operations of authorization service network 302 and/or end-user network 320. As another example database devices 306 may include biographical information pertaining to encrypted photo IDs and/or information allowing encrypted photo ID information to be decrypted by a reading device accessing the authorization service network 302.

Server devices 308 can be used for computational, data storage, communication, and service hosting operations. These servers may be virtualized (i.e., the servers may be virtual machines). In some cases, the server devices 308 may be physically present on authorization service network 302. In other cases, the server devices 308 may be remote server devices hosted by third-party networks (e.g., AMAZON WEB SERVICES® and MICROSOFT® AZURE®).

Virtual machines 310 may be emulations of a computing system, and may mimic the functionality (e.g., processor, memory, and communication resources) of a physical computer. In some embodiments, virtual machines 310 may be managed by a centralized server device or application that facilitates allocation of physical computing resources to individual virtual machines, as well as performance and error reporting. Virtual machines 310 may be employed in order to allocate computing resources in an efficient, as needed fashion. Providers of virtual machines 310 may include VMWARE® and MICROSOFT®. In some embodiments, virtual machines 310 may support operating system level virtualization that allows for multiple isolated user-space instances, or "containers." Such type of virtualization may be supported by providers such as DOCKER® and in turn may be managed by a container orchestration software provider, such as KUBERNETES®.

Load balancer 312 may distribute traffic among one or more physical or virtual devices on authorization service network 302. For instance, if authorization service network 302 includes multiple physical or virtual computing devices, load balancer 312 may distribute network traffic and computational tasks across the multiple devices so that no one device is processing more tasks than the others (or more than its specified capabilities allow).

Rules engine 314 may be a configurable program that, contingent on current operating parameters of end-user network 320, establishes one or more operations that should be performed on behalf of end-user network 320. In particular, rules engine 314 may be configured by users from end-user network 320 to support custom operations, such as those described herein, relating to facial recognition, key management, authentication, and other operations.

Notably, the configuration of authorization service network 302 is provided as an example. Other configurations and additional devices may exist. For example authorization service network 302 may contain additional components to those described above (e.g., routers, gateways, etc.). In addition, various client devices, such as personal computers, printing devices, or mobile devices (such as portable card reading devices) may be connected to authorization service network 302 at any given time. Any component on authorization service network 302 may be replicated across multiple computing devices to provide data duplication and increase capacity of services. Replicated components may be located at various computing locations to ensure high availability in case of power failure at one computing location. In some cases, authorization service network 302 may consist of a few devices and a small number of components. In other deployments, authorization service network 302 may span across multiple physical locations and hundreds of devices and components.

End-user network 320 may be one or more networks in which printing device(s) 330 and reading device(s) 332 reside. As described herein, printing device(s) 330 may assist with issuing a secondary photo ID, such as by scanning a primary ID and printing a secondary photo ID having a photo with an integrated encrypted watermark, but with little or no other biographical information. Also as described herein, the reading device(s) 332 may be used to verify a secondary photo ID presented by a person, such as by scanning the ID and decrypting the integrated encrypted watermark. In some implementations, while the printing device(s) 330 and reading device(s) 332 may both be consider "end users" and are illustrated in a common end-user network 320 in FIG. 3, the printing device(s) 330 and reading device(s) 332 may reside on two or more separate end-user networks, without access to one another via a single trusted network. In other words, more than one trusted network may be used, in some implementations.

IV. SYSTEMS FOR ISSUING AND VERIFYING A SECONDARY CRYPTOGRAPHIC PHOTO ID

Figure 4:
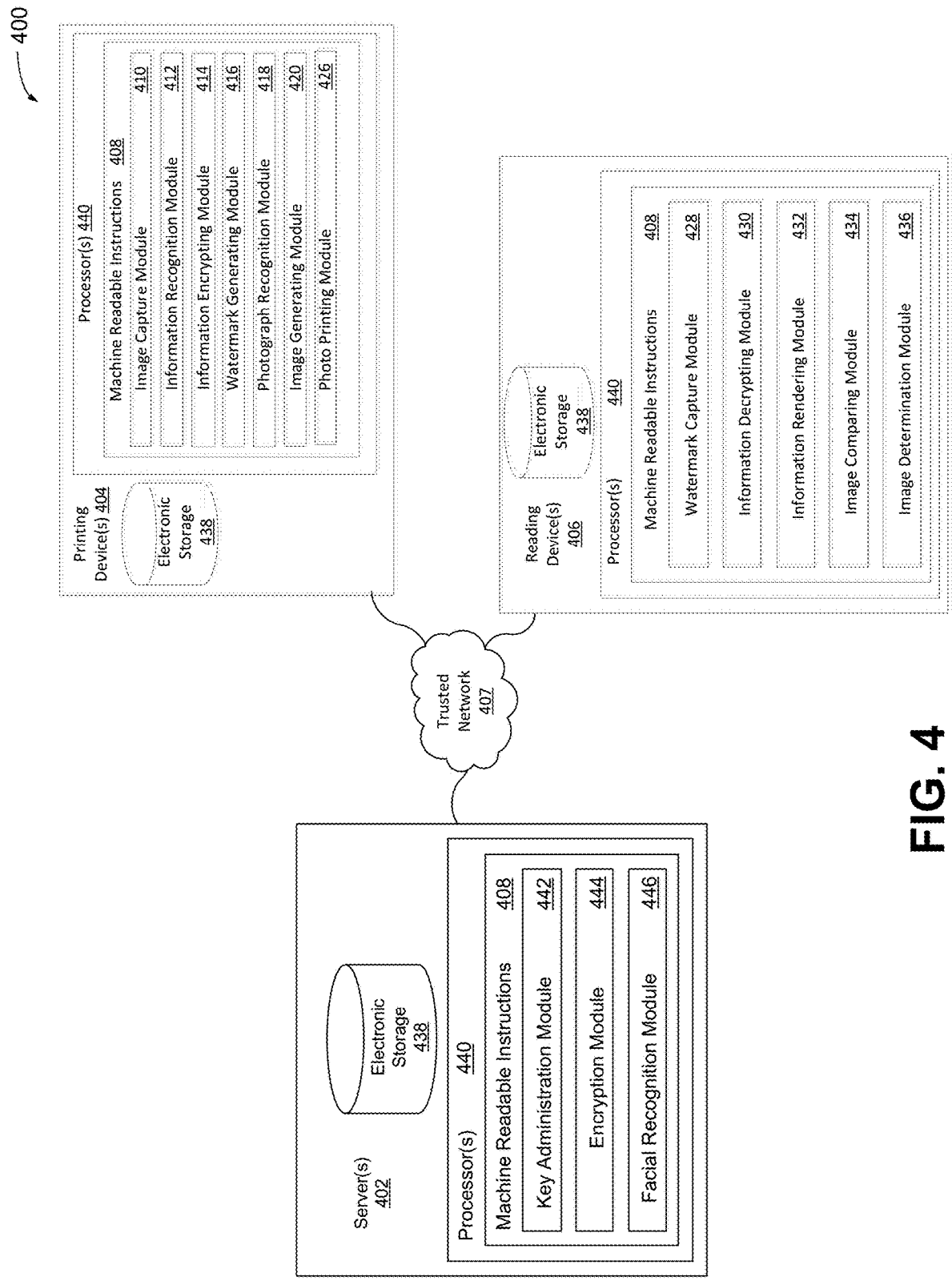
FIG. 4 illustrates a simplified block diagram exemplifying a system configured for issuing and verifying a secondary cryptographic photo ID, in accordance with one or more implementations.

FIG. 4 illustrates a system 400 configured for issuing and verifying a secondary cryptographic photo ID, in accordance with one or more implementations. In some implementations, system 400 may include one or more servers 402. Server(s) 402 may be configured to communicate with one or more printing device(s) 404 and/or one or more reading device(s) 406 according to a client/server architecture and/or other architectures. Printing device(s) 404 and reading device(s) 406 (both examples of client computing platforms) may be configured to communicate with other client computing platforms via server(s) 402 and/or according to a peer-to-peer architecture and/or other architectures. Users may access system 400 via printing device(s) 404 and/or reading device(s) 406, for example.

In some implementations, server(s) 402, printing device(s) 404, and/or reading device(s) 406 may be operatively linked via one or more electronic communication links to allow for data transmission between devices. For example, such electronic communication links may be established, at least in part, via a network such as the Internet and/or other networks, which may consist of or include one or more trusted networks 407. The format of each respective data transmission can include one or more of a variety of different formats including: text formats, image formats, extensible mark-up language (XML), Simple Network Maintenance Protocol (SNMP) formats, database tables, a flat file format, a format associated with a page definition language, or another format. It will be appreciated that this is not intended to be limiting, and that the scope of this disclosure includes implementations in which server(s) 402, printing device(s) 404, and/or reading device(s) 406 may be operatively linked via some other communication media.

Server(s) 402 may include electronic storage 438, one or more processors 440, and/or other components configured to execute computer program modules via machine readable instructions 408. For example, the machine readable instructions 408 may include instructions for performing one or more functions or operations described herein, such as functions or operations pertaining to network communications, image capture, and other functions and operations described throughout this specification, including in FIG. 7 and others. Server(s) 402 may include communication lines, or ports to enable the exchange of information with the network 407 and/or other computing platforms, such as the printing device(s) 404 and/or reading device(s) 406. Illustration of server(s) 402 in FIG. 4 is not intended to be limiting. Server(s) 402 may include a plurality of hardware, software, and/or firmware components operating together to provide the functionality attributed herein to server(s) 402. For example, server(s) 402 may be implemented by a cloud of computing platforms operating together as server(s) 402.

A given printing device 404 may include electronic storage 438 (which may be the same as or different from the processor(s) in server(s) 402), one or more processors 440 (which may be the same as or different from the processor(s) in server(s) 402), and/or other components configured to execute computer program modules via machine readable instructions 408. The computer program modules may be configured to enable an expert or user associated with the given printing device 404 to interface with system 400 and/or provide other functionality attributed herein to printing device(s) 404. By way of non-limiting example, the given printing device 404 may include one or more of a printer alone or in combination with a desktop computer, a laptop computer, a handheld computer, a tablet computing platform, a Smartphone, a gaming console, and/or other computing platform.

A given reading device 406 may also include electronic storage 438 (which may be the same as or different from the processor(s) in server(s) 402 and/or printing device(s) 404), one or more processors 440 (which may be the same as or different from the processor(s) in server(s) 402 and/or printing device(s) 404), and/or other components configured to execute computer program modules configured to execute computer program modules via machine readable instructions 408. The computer program modules may be configured to enable an expert or user associated with the given reading device 406 to interface with system 400 and/or provide other functionality attributed herein to reading device(s) 406. By way of non-limiting example, the given reading device 406 may include one or more of a handheld scanner, a desktop computer, a laptop computer, a handheld computer, a tablet computing platform, a Smartphone, a gaming console, and/or other computing platform.

Electronic storage 438 can include one or more computer-readable storage media configured to store data and/or instructions that can be read and/or accessed by at least one of processors 440. The one or more computer-readable storage media can include one or more volatile and/or non-volatile storage components, such as optical, magnetic, organic or other memory or disc storage, which can be integrated in whole or in part with at least one of processors 440. The computer-readable storage media can include one or more components that store data for short periods of time like register memories, processor caches, and/or random access memories (RAM). The computer-readable storage media can include non-transitory computer readable media that stores program code and/or data for longer periods of time, such as secondary or persistent long term storage; for example, read only memory (ROM), optical or magnetic disks, compact-disc read only memory (CD-ROM). In some embodiments, electronic storage 438 can be implemented using a single physical device (e.g., one optical, magnetic, organic or other memory or disk storage unit), while in other embodiments, electronic storage 438 can be implemented using two or more physical devices. The electronic storage media of electronic storage 438 may include one or both of system storage that is provided integrally (i.e., substantially non-removable) with server(s) 402, printing device(s) 404, or reading device(s) 406 and/or removable storage that is removably connectable to server(s) 402, printing device(s) 404, or reading device(s) 406 via, for example, a port (e.g., a USB port, a firewire port, etc.) or a drive (e.g., a disk drive, etc.). Electronic storage 438 may include one or more virtual storage resources (e.g., cloud storage, a virtual private network, and/or other virtual storage resources). Electronic storage 438 may store software algorithms, information determined by processor(s) 440, information received from server(s) 402, printing device(s) 404, or reading device(s) 406, and/or other information that enables server(s) 402, printing device(s) 404, and reading device(s) 406 to function as described herein.

Processor(s) 440 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs)). Although processor(s) 440 is shown in FIG. 4 as a single entity in each of server(s) 402, printing device(s) 404, and reading device(s) 406, this is for illustrative purposes only. In some implementations, processor(s) 440 each may include a plurality of processing units. These processing units may be physically located within the same device, or processor(s) 440 may represent processing functionality of a plurality of devices operating in coordination. Processors 440 can be configured to execute computer-readable instructions that are contained in electronic storage 438 and/or other instructions as described herein. For example, Processor(s) 440 may be configured to execute one or more of modules 410-446, and/or other modules. Processor(s) 440 may be configured to execute one or more of modules 410-446, and/or other modules by software; hardware; firmware; some combination of software, hardware, and/or firmware; and/or other mechanisms for configuring processing capabilities on processor(s) 440. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 410-446 are illustrated in FIG. 4 as being implemented within a single processing unit in one of server(s) 402, printing device(s) 404, or reading device(s) 406, in implementations in which processor(s) 440 includes multiple processing units, one or more of modules 410-446 may be implemented remotely from the other modules. The description of the functionality provided by the different modules 410-446 described below is for illustrative purposes, and is not intended to be limiting, as any of modules 410-446 may provide more or less functionality than is described. For example, one or more of modules 410-446 may be eliminated, and some or all of its functionality may be provided by other ones of modules 410-446. As another example, processor(s) 440 may be configured to execute one or more additional modules that may perform some or all of the functionality attributed below to one of modules 410-446.

Modules 410-426 are associated with the printing device 404 in the described embodiment.

Image capture module 410 may be configured to capture, using a scanning component of the printing device 404, a primary digital image of a primary photo ID. The primary photo ID may be a passport, driver license, or identification card, for example.

Information recognition module 412 may be configured to recognize, using a processing component of the printing device 404 (including a computing device communicatively connected to the printing device 404), alphanumeric information in the captured primary digital image. The recognized alphanumeric information may include biographical information related to a person associated with the primary photo ID. The biographical information may include a full name of the person associated with the primary photo ID. The biographical information may include a physical address of the person associated with the primary photo ID. The biographical information may include a date of birth of the person associated with the primary photo ID. The biographical information may include an expiration date of the primary photo ID.

Information encrypting module 414 may be configured to encrypt, using the processing component of the printing device 404 (including a computing device communicatively connected to the printing device 404), the recognized alphanumeric information.

Encrypting, using the processing component of the printing device, the recognized alphanumeric information may include encrypting the recognized alphanumeric information using an encryption key. The encrypting may include using an asymmetric encryption algorithm, using a public key and a first private key. For example, the printing device 404 may have a private key associated with it. Encrypting, using the processing component of the printing device, the recognized alphanumeric information may include communicating the key to an authorization service (such as one offered by server 402) on the trusted network 407, to allow the authorization service to store the key in a key database maintained by the authorization service. Encrypting, using the processing component of the printing device, the recognized alphanumeric information may include obtaining a key from an authorization service on the trusted network 407. Encrypting, using the processing component of the printing device, the recognized alphanumeric information may include encrypting the recognized alphanumeric information using a key and/or communicating the key to a key database. For example, the printing device 404 and key database, which may be stored in the electronic storage 438 of server 402, may be authorized on the trusted network 407.

The encrypted recognized alphanumeric information may include an associated expiration date (which may also be encrypted), after which decryption using the trusted network 407 is not authorized. As such, a key used for encrypting the recognized alphanumeric information may have an associated key expiration date.

Watermark generating module 416 may be configured to generate, using the processing component of the printing device 404 (including in a computing device communicatively connected to the printing device 404), a digital watermark including the encrypted recognized alphanumeric information. The digital watermark may be in the form of a bar code or QR code, for example. Alternatively, the digital watermark may be imperceptible to an unassisted human eye. The digital watermark may be an embedded cryptographic watermark signed by at least a portion of the primary digital image. The generated digital watermark at least partially spatially overlaps the recognized at least the portion of the image of the person associated with the primary photo ID. The generated digital watermark may be unique to the printing device. The generated digital watermark may include an identifier associated with the printing device. By way of non-limiting example, the identifier may be selected from the group consisting of a serial number, a unique code, a date and time of manufacturing of the printing device, or a unique image. The generated digital watermark at least partially spatially overlaps the recognized image of the face of the person associated with the primary photo ID.

Photograph recognition module 418 may be configured to recognize, using the processing component of the printing device 404, a photograph in the primary digital image. The photograph may be of the person associated with the primary photo ID. Photograph recognition module 418 may be configured to recognize in the photograph at least a portion of an image of the person associated with the primary photo ID. Photograph recognition module 418 may be configured to recognize in the photograph an image of a face of the person associated with the primary photo ID.

Image generating module 420 may be configured to generate, using the processing component of the printing device 404 (including in a computing device communicatively connected to the printing device 404), a secondary digital image including the recognized photograph and the generated digital watermark. The digital watermark may be an embedded cryptographic watermark signed by at least a portion of the recognized photograph. The generated digital watermark at least partially spatially overlaps the recognized photograph in the secondary digital image. Generating the secondary digital image including the recognized photograph and the generated digital watermark may include integrating the generated digital watermark into the recognized photograph in the secondary digital image. For example, generated digital watermark may be integrated into the recognized photograph so that the generated digital watermark at least partially overlaps the recognized face.

Photo printing module 426 may be configured to print, using a printing component of the printing device, a secondary photo ID including the secondary digital image. By way of non-limiting example, the secondary photo ID may be a temporary, cryptographic photo ID having an associated expiration date and/or time, in which the secondary photo ID does not include the biographical information related to the person associated with the primary photo ID. The printing device 404 may be configured to authenticate a person associated with the primary photo ID, before printing the secondary photo ID.

Modules 410-426 are associated with the reading device 406 in the described embodiment.

Watermark capture module 428 may be configured to capture, using a digital camera of a reading device 406, the digital watermark from the secondary digital image of the secondary photo ID. The reading device 406 may be a portable handheld device. The reading device may be authorized on the trusted network 407. The digital camera of the reading device 406 may include a scanner authorized on the trusted network 407. By way of non-limiting example, the user of the reading device 406 may be at least one of a law enforcement officer, a government official, or an access-control person. Capturing the digital watermark may include recognizing, using a processor of the reading device, the digital watermark from the secondary digital image.

Information decrypting module 430 may be configured to decrypt, using a processor of the reading device 406, the recognized alphanumeric information. This may include, for example, accessing and/or downloading, by the reading device, a key database on the trusted network 407, and decrypting the encrypted recognized alphanumeric information using the downloaded key. The key database may be maintained by an authorization service on the trusted network 407. The encrypted recognized alphanumeric information may include an associated expiration date, after which the processor of the reading device 406 is unable to decrypt the encrypted recognized alphanumeric information.

Information rendering module 432 may be configured to render, on a display of the reading device 406, the decrypted recognized alphanumeric information. In some implementations, the rendering, on the display of the reading device 406, the decrypted recognized alphanumeric information may allow for a user of the reading device 406 to verify an identity of a person presenting the secondary photo ID by the user comparing the recognized photo in the secondary photo ID to an appearance of the person presenting the secondary photo ID.

The reading device may be configured to capture, using the digital camera of the reading device, an image of a person presenting the secondary photo ID. In such a case, image comparing module 434 may be configured to compare, using the processor of the reading device 406, the image of the person presenting the secondary photo ID with the recognized photograph in secondary digital image.

Image determination module 436 may be configured to determine whether the image of the person presenting the secondary photo ID matches, within a tolerance, with the recognized photograph in secondary digital image. In some implementations, the comparing and the determining may include the processor of the reading device executing instructions for facial recognition.

Alternatively, the functions of the image comparing module 434 and the image determination module 436 may be performed with the assistance of a user accessing information that includes information from the reading device 406.

The reading device 406 may then validate that the image, watermark, and graphical code are authentic and untampered before sending the encrypted data to a centralized server (e.g. a government server), which may then reply with information of the individual such as name, address and date of birth.

Modules 442-446 are associated with the server 402 in the described embodiment.

The key administration module can assist in storing and providing authenticated access to one or more keys used for encryption. For example, the printing device 404 and/or reading device 406 may be communicatively connected via the trusted network 407 (or separate trusted networks) to the server 402.

The encryption module 444 may be used, in some embodiments, to assist the printing device 404 in encrypting alphanumeric information. In additional or alternative embodiments, the encryption module 444 may assist the reading device 406 in decrypting encrypted alphanumeric information. In other embodiments encryption and/or decryption is performed entirely at the printing device 404 and/or reading device 406.

The facial recognition module 446 may be used, in some embodiments, to assist the printing device 404 in authenticating a user before printing a secondary photo ID and/or in assisting in the functions of the image comparing module 434 and the image determination module 436 of the reading device.

Figure 5:
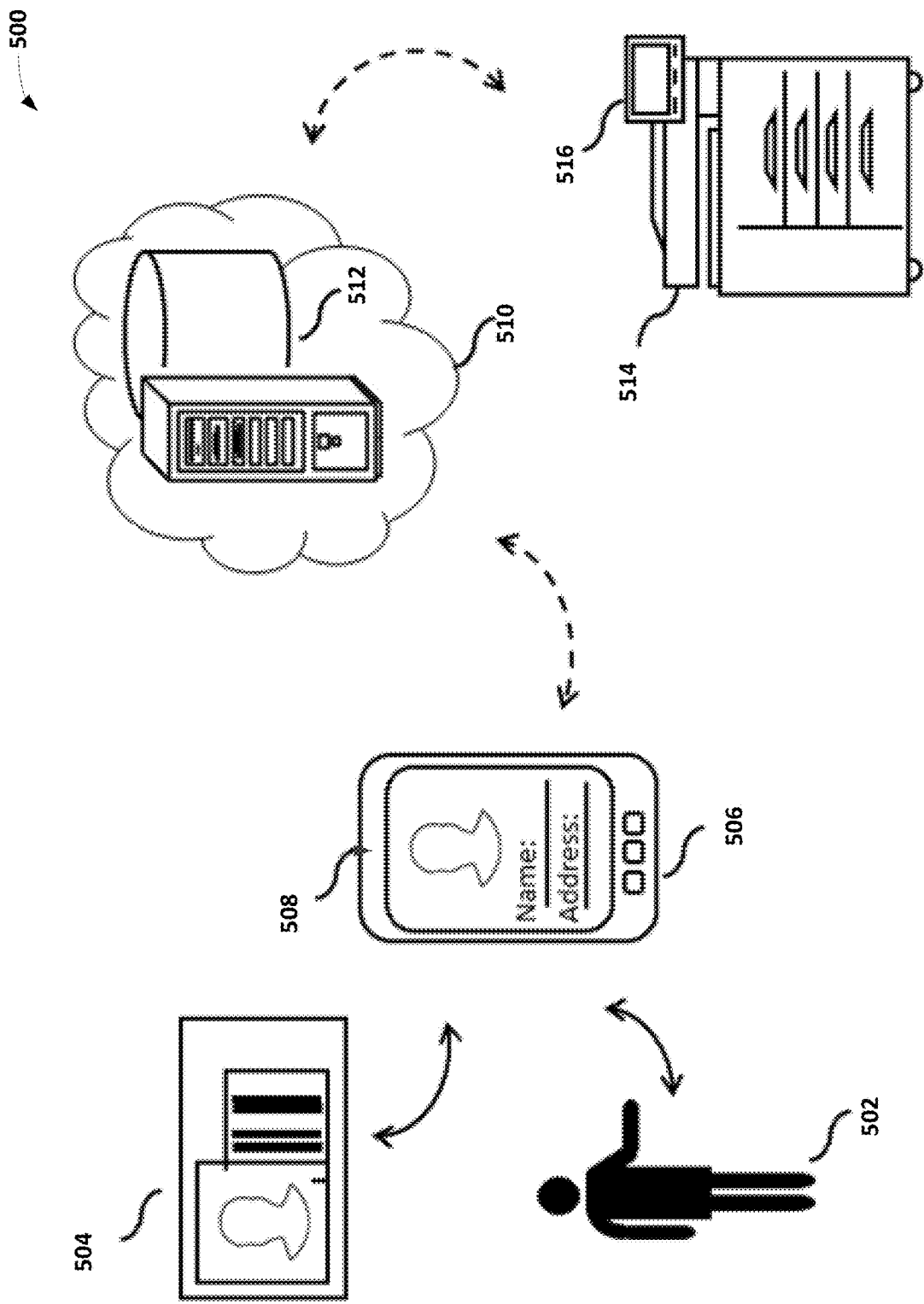
FIG. 5 illustrates a simplified block diagram exemplifying a system to read and decrypt a photo ID with watermark on a trusted network, in accordance with one or more implementations.

FIG. 5 illustrates a system 500 to read and decrypt a photo ID with watermark on a trusted network, in accordance with one or more example implementations. When a user 502 encounters a situation where his or her primary ID is either lost, stolen, or unavailable, this backup or secondary ID 504 can be presented to a government official who has a reading device 506 that can scan this ID 504. The reading device 506 will then validate that the image, watermark, and graphical code, as described herein, are authentic and untampered-with (e.g. via image analysis) before sending this encrypted data to a centralized government server 510.

The watermark can be decrypted only by a specific type of reading device 506, according to some embodiments, and by applying an encryption key. The reading device 506 with camera has access to the server 510 and its database 512, which has security keys generated by printers 514 (having terminals 516) during issuance of the secondary photo ID 504. The encryption/decryption key is available for a short time, which makes a secondary photo ID valid only for the limited time. The server 510 then replies to the reading device 506 with information associated with the individual, such as name, address, and date of birth.

A reading device 506 (which could be a mobile device with a camera, in some embodiments) reads the graphical (e.g. alphanumeric) code, decrypts information, and displays the information 508 in a human readable format on the reading device 506. The photo of the person's face is present on the secondary photo ID to allow others to determine that the secondary photo ID legally belongs to the person presenting the secondary photo ID.

Figure 6:
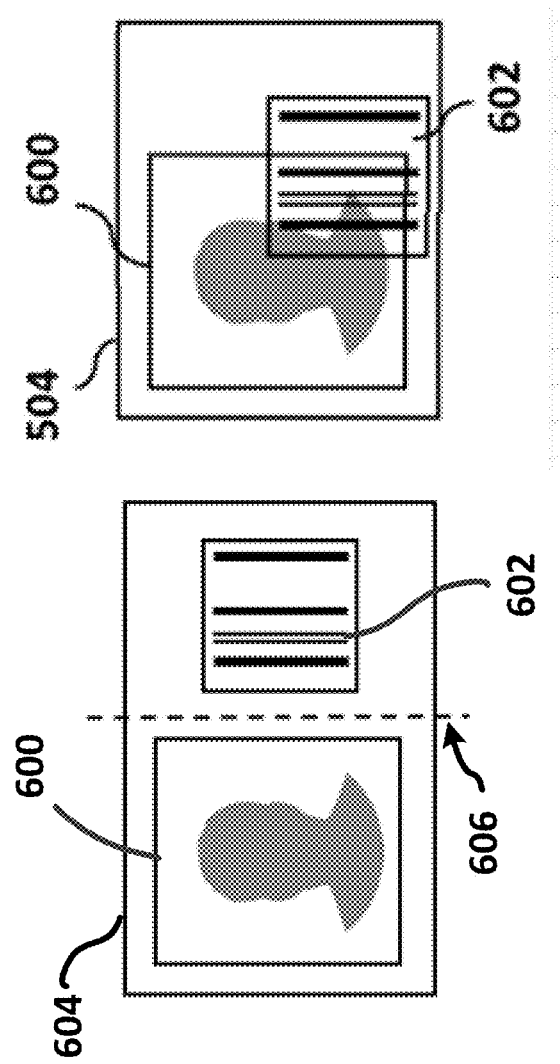
FIG. 6 illustrates a simplified block diagram exemplifying two possible placements for the watermark on the photo ID, in accordance with one or more implementations.

FIG. 6 illustrates two possible placements for the watermark on the photo ID, in accordance with one or more implementations. The first placement 604, shown on the left in FIG. 6, is less preferred, because it includes a watermark 602 that does not overlap with a photo 600, as shown by a demarcation line 606. The lack of an overlap makes it easier for an unauthorized person to tamper with the photo ID because manipulation or modification of either of the photo 600 or watermark 602 is unlikely to affect the appearance of the other of the photo 600 and watermark 602. For example, the photo 600 could be replaced with a different photo, without altering the watermark 602.

The second placement 504, shown on the right in FIG. 6, is more preferred, because it includes the watermark 602 overlapping with the photo 600. This overlap makes it more difficult for an unauthorized person to tamper with the photo ID because manipulation or modification of either of the photo 600 or watermark 602 will likely affect the appearance of the other of the photo 600 and watermark 602.

V. METHODS FOR ISSUING A SECONDARY CRYPTOGRAPHIC PHOTO ID

Figure 7:
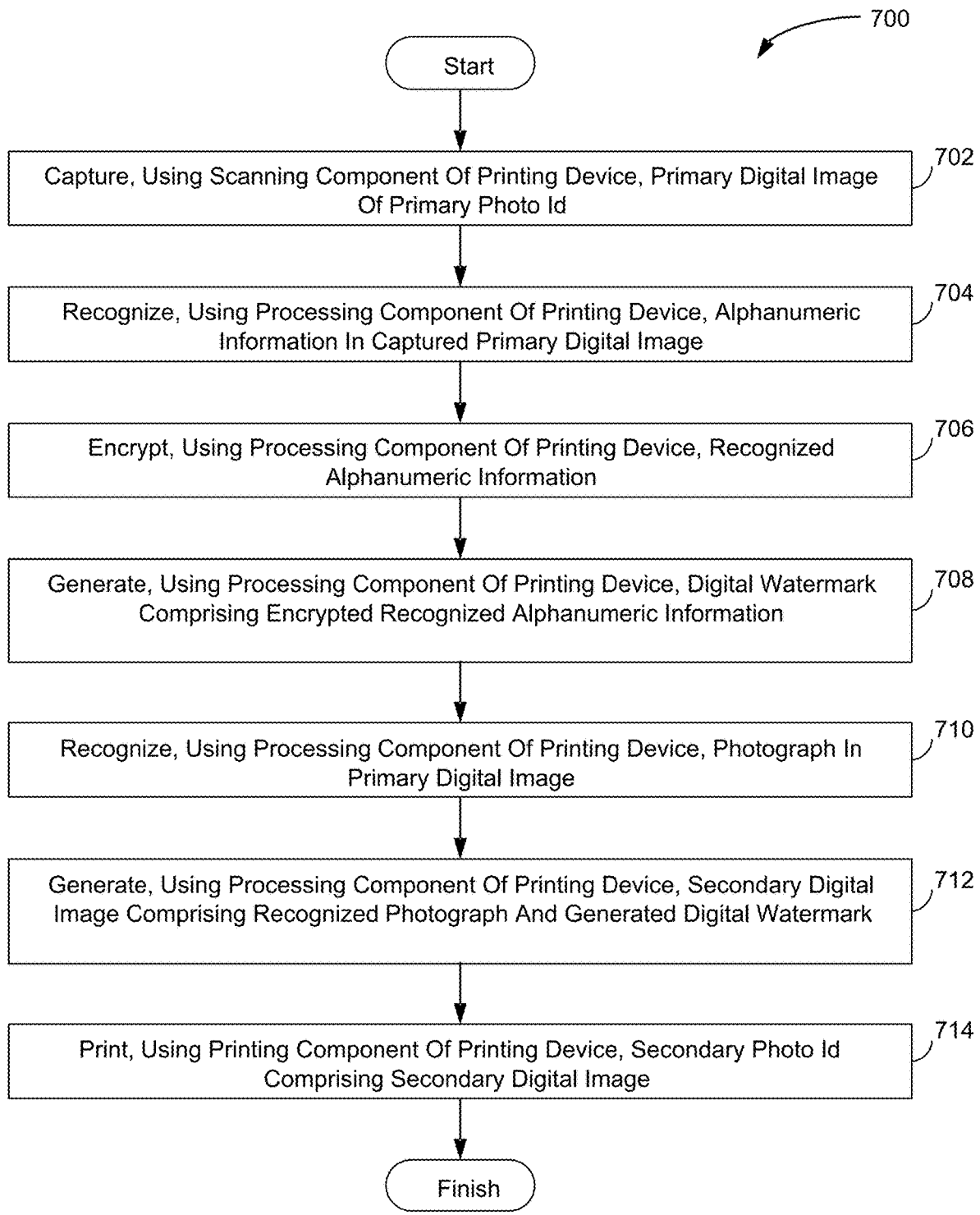
FIG. 7 illustrates a simplified flow diagram exemplifying a method for issuing and verifying a secondary cryptographic photo ID, in accordance with one or more implementations.

FIG. 7 illustrates a method 700 for issuing a secondary cryptographic photo ID, in accordance with one or more implementations. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 and described below is not intended to be limiting.

In some implementations, method 700 may be implemented in one or more processing devices (e.g., a digital processor, an analog processor, a digital circuit designed to process information, an analog circuit designed to process information, a state machine, and/or other mechanisms for electronically processing information). For example, the method 700 may be carried out by a computing device, such as computing device 100, a cluster of computing devices, such as server cluster 200, and/or one or more of the devices illustrated in FIG. 4. The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

An operation 702 may include capturing, using a scanning component of a printing device, a primary digital image of a primary photo ID. The printing device may be authorized on a trusted network, for example. Operation 702 may be performed by one or more hardware processors configured by machine-readable instructions including a module that is the same as or similar to image capture module 410, in accordance with one or more implementations.

An operation 704 may include recognizing, using a processing component of the printing device, alphanumeric information in the captured primary digital image. The recognized alphanumeric information may include biographical information related to a person associated with the primary photo ID. Operation 704 may be performed by one or more hardware processors configured by machine-readable instructions including a module that is the same as or similar to information recognition module 410, in accordance with one or more implementations.

An operation 706 may include encrypting, using the processing component of the printing device, the recognized alphanumeric information. Operation 706 may be performed by one or more hardware processors configured by machine-readable instructions including a module that is the same as or similar to information encrypting module 412, in accordance with one or more implementations.

An operation 708 may include generating, using the processing component of the printing device, a digital watermark including the encrypted recognized alphanumeric information. Operation 708 may be performed by one or more hardware processors configured by machine-readable instructions including a module that is the same as or similar to watermark generating module 416 described with reference to FIT. 4, in accordance with one or more implementations.

An operation 710 may include recognizing, using the processing component of the printing device, a photograph in the primary digital image. The photograph may be of the person associated with the primary photo ID. Operation 710 may be performed by one or more hardware processors configured by machine-readable instructions including a module that is the same as or similar to photograph recognition module 418, in accordance with one or more implementations.

An operation 712 may include generating, using the processing component of the printing device, a secondary digital image including the recognized photograph and the generated digital watermark. The generated digital watermark at least partially spatially overlaps the recognized photograph in the secondary digital image. Operation 712 may be performed by one or more hardware processors configured by machine-readable instructions including a module that is the same as or similar to image generating module 420, in accordance with one or more implementations.

An operation 714 may include printing, using a printing component of the printing device, a secondary photo ID including the secondary digital image, in which the secondary photo ID does not include the biographical information related to the person associated with the primary photo ID. Operation 714 may be performed by one or more hardware processors configured by machine-readable instructions including a module that is the same as or similar to photo printing module 426, in accordance with one or more implementations.

VI. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method for issuing and verifying a secondary cryptographic photo ID, comprising:

capturing, using a scanning component of a printing device, a primary digital image of a primary photo ID, wherein the printing device is authorized on a trusted network;

recognizing, using a processing component of the printing device, alphanumeric information in the captured primary digital image, wherein the recognized alphanumeric information includes biographical information related to a person associated with the primary photo ID;

encrypting, using the processing component of the printing device, the recognized alphanumeric information;

generating, using the processing component of the printing device, a digital watermark comprising the encrypted recognized alphanumeric information;

recognizing, using the processing component of the printing device, a photograph in the primary digital image, wherein the photograph is of the person associated with the primary photo ID;

generating, using the processing component of the printing device, a secondary digital image comprising the recognized photograph and the generated digital watermark, wherein the generated digital watermark at least partially spatially overlaps the recognized photograph in the secondary digital image; and printing, using a printing component of the printing device, a secondary photo ID comprising the secondary digital image, wherein the secondary photo ID does not include the biographical information related to the person associated with the primary photo ID, and wherein the secondary photo ID has associated expiration date and/or time, after which the secondary photo ID is no longer valid.

2. The method of claim 1, further comprising:

capturing, using a digital camera of a reading device, the digital watermark from the secondary digital image of the secondary photo ID;

decrypting, using a processor of the reading device, the recognized alphanumeric information; and rendering, on a display of the reading device, the decrypted recognized alphanumeric information.

3. The method of claim 1, further comprising recognizing in the photograph at least a portion of an image of the person associated with the primary photo ID, wherein the generated digital watermark at least partially spatially overlaps the recognized at least the portion of the image of the person associated with the primary photo ID.

4. The method of claim 1, further comprising recognizing in the photograph an image of a face of the person associated with the primary photo ID, wherein the generated digital watermark at least partially spatially overlaps the recognized image of the face of the person associated with the primary photo ID.

5. The method of claim 1, wherein the generated digital watermark is unique to the printing device.

6. The method of claim 1, wherein the generated digital watermark includes an identifier associated with the printing device.

7. The method of claim 6, wherein the identifier is selected from the group consisting of a serial number, a unique code, a date and time of manufacturing of the printing device, or a unique image.

8. A system configured for issuing and verifying a secondary cryptographic photo ID, the system comprising:

one or more hardware processors configured by machine-readable instructions to:

capture, using a scanning component of a printing device, a primary digital image of a primary photo ID, wherein the printing device is authorized on a trusted network;

recognize, using a processing component of the printing device, alphanumeric information in the captured primary digital image, wherein the recognized alphanumeric information includes biographical information related to a person associated with the primary photo ID;

encrypt, using the processing component of the printing device, the recognized alphanumeric information;

generate, using the processing component of the printing device, a digital watermark comprising the encrypted recognized alphanumeric information;

recognize, using the processing component of the printing device, a photograph in the primary digital image, wherein the photograph is of the person associated with the primary photo ID;

generate, using the processing component of the printing device, a secondary digital image comprising the recognized photograph and the generated digital watermark, wherein the generated digital watermark at least partially spatially overlaps the recognized photograph in the secondary digital image; and print, using a printing component of the printing device, a secondary photo ID comprising the secondary digital image, wherein the secondary photo ID does not include the biographical information related to the person associated with the primary photo ID, and wherein the secondary photo ID has associated expiration date and/or time, after which the secondary photo ID is no longer valid.

9. The system of claim 8, wherein the one or more hardware processors are further configured by machine-readable instructions to:

capture, using a digital camera of a reading device, the digital watermark from the secondary digital image of the secondary photo ID;

decrypt, using a processor of the reading device, the recognized alphanumeric information;

render, on a display of the reading device, the decrypted recognized alphanumeric information.

10. The system of claim 8, wherein the one or more hardware processors are further configured by machine-readable instructions to recognize in the photograph at least a portion of an image of the person associated with the primary photo ID, wherein the generated digital watermark at least partially spatially overlaps the recognized at least the portion of the image of the person associated with the primary photo ID.

11. The system of claim 8, wherein the one or more hardware processors are further configured by machine-readable instructions to recognize in the photograph an image of a face of the person associated with the primary photo ID, wherein the generated digital watermark at least partially spatially overlaps the recognized image of the face of the person associated with the primary photo ID.

12. The system of claim 8, wherein the generated digital watermark is unique to the printing device.

13. The system of claim 8, wherein the generated digital watermark includes an identifier associated with the printing device.

14. The system of claim 13, wherein the identifier is selected from the group consisting of a serial number, a unique code, a date and time of manufacturing of the printing device, or a unique image.

15. A non-transient computer-readable storage medium having instructions embodied thereon, the instructions being executable by one or more processors to perform a method for issuing and verifying a secondary cryptographic photo ID, the method comprising:

capturing, using a scanning component of a printing device, a primary digital image of a primary photo ID, wherein the printing device is authorized on a trusted network;

recognizing, using a processing component of the printing device, alphanumeric information in the captured primary digital image, wherein the recognized alphanumeric information includes biographical information related to a person associated with the primary photo ID;

encrypting, using the processing component of the printing device, the recognized alphanumeric information;

generating, using the processing component of the printing device, a digital watermark comprising the encrypted recognized alphanumeric information;

recognizing, using the processing component of the printing device, a photograph in the primary digital image, wherein the photograph is of the person associated with the primary photo ID;

generating, using the processing component of the printing device, a secondary digital image comprising the recognized photograph and the generated digital watermark, wherein the generated digital watermark at least partially spatially overlaps the recognized photograph in the secondary digital image; and printing, using a printing component of the printing device, a secondary photo ID comprising the secondary digital image, wherein the secondary photo ID does not include the biographical information related to the person associated with the primary photo ID, and wherein the secondary photo ID has associated expiration date and/or time, after which the secondary photo ID is no longer valid.

16. The computer-readable storage medium of claim 15, wherein the method further comprises:
capturing, using a digital camera of a reading device, the digital watermark from the secondary digital image of the secondary photo ID;
decrypting, using a processor of the reading device, the recognized alphanumeric information; and
rendering, on a display of the reading device, the decrypted recognized alphanumeric information.

17. The computer-readable storage medium of claim 15, wherein the method further comprises recognizing in the photograph at least a portion of an image of the person associated with the primary photo ID, wherein the generated digital watermark at least partially spatially overlaps the recognized at least the portion of the image of the person associated with the primary photo ID.

18. The computer-readable storage medium of claim 15, wherein the method further comprises recognizing in the photograph an image of a face of the person associated with the primary photo ID, wherein the generated digital watermark at least partially spatially overlaps the recognized image of the face of the person associated with the primary photo ID.

19. The computer-readable storage medium of claim 15, wherein the generated digital watermark is unique to the printing device.

20. The computer-readable storage medium of claim 15, wherein the generated digital watermark includes an identifier associated with the printing device.

* * * * *